United States Patent
Warren

(10) Patent No.: US 10,608,449 B2
(45) Date of Patent: Mar. 31, 2020

(54) ELECTRICAL CHARGING DEVICES WITH TRANSLATING STABILIZERS

(71) Applicant: William J. Warren, Frisco, TX (US)

(72) Inventor: William J. Warren, Frisco, TX (US)

(*) Notice: Subject to any disclaimer, the term of this patent is extended or adjusted under 35 U.S.C. 154(b) by 0 days.

(21) Appl. No.: 15/818,711

(22) Filed: Nov. 20, 2017

(65) Prior Publication Data

US 2018/0248392 A1 Aug. 30, 2018

Related U.S. Application Data

(63) Continuation-in-part of application No. 15/788,708, filed on Oct. 19, 2017, which is a continuation-in-part of application No. 15/697,307, filed on Sep. 6, 2017, now Pat. No. 9,997,882.

(60) Provisional application No. 62/464,077, filed on Feb. 27, 2017, provisional application No. 62/464,517, filed on Feb. 28, 2017, provisional application No.
(Continued)

(51) Int. Cl.
| | |
|---|---|
| *H02J 7/00* | (2006.01) |
| *H01R 13/44* | (2006.01) |
| *H01R 13/60* | (2006.01) |
| *H01R 13/66* | (2006.01) |
| *H02J 7/02* | (2016.01) |
| *H01R 31/06* | (2006.01) |
| *H01R 33/05* | (2006.01) |

(Continued)

(52) U.S. Cl.
CPC .......... *H02J 7/0044* (2013.01); *H01R 13/44* (2013.01); *H01R 13/60* (2013.01); *H01R 13/66* (2013.01); *H01R 31/06* (2013.01); *H01R 33/05* (2013.01); *H02J 7/0052* (2013.01); *H02J 7/02* (2013.01); *H01R 24/68* (2013.01); *H02J 2007/0062* (2013.01); *H04M 1/04* (2013.01)

(58) Field of Classification Search
CPC .......... H02J 7/0044; H02J 7/02; H01R 13/44; H01R 13/60
USPC .......... 439/638
See application file for complete search history.

(56) References Cited

U.S. PATENT DOCUMENTS

| | | |
|---|---|---|
| 2,392,445 A | 1/1946 | Anderson |
| 4,536,694 A | 8/1985 | McCarty et al. |

(Continued)

FOREIGN PATENT DOCUMENTS

| | | |
|---|---|---|
| EP | 2228263 A1 | 9/2010 |
| WO | WO2016003585 A1 | 1/2016 |

OTHER PUBLICATIONS

International Search Report and Written Opinion dated Sep. 4, 2015 for Patent Cooperation Treaty Application PCT/US2015/034073, filed Jun. 3, 2015, 8 pages.

*Primary Examiner* — Alexander Gilman
(74) *Attorney, Agent, or Firm* — Carr & Ferrell LLP

(57) ABSTRACT

Electrical charging devices with translating stabilizers are disclosed herein. An example apparatus includes a cradle configured to receive and retain an electronic device; an electronics sub-assembly including: a housing, wherein the housing includes laterally positioned tubular guides; an electrical conductor that protrudes forwardly from the housing; and a circuit within the housing that processes an electrical charge received through the electrical conductor; means for electrically coupling the electronics sub-assembly with the electronic device; and a stabilizer comprising armatures, the armatures being slidingly received within the tubular guides of the housing for storage, further wherein the
(Continued)

armatures extend from the tubular guides and pivot downwardly.

20 Claims, 3 Drawing Sheets

Related U.S. Application Data

62/465,705, filed on Mar. 1, 2017, provisional application No. 62/465,871, filed on Mar. 2, 2017, provisional application No. 62/466,576, filed on Mar. 3, 2017, provisional application No. 62/473,225, filed on Mar. 17, 2017, provisional application No. 62/467,230, filed on Mar. 5, 2017, provisional application No. 62/532,060, filed on Jul. 13, 2017, provisional application No. 62/532,843, filed on Jul. 14, 2017.

(51) Int. Cl.
    *H04M 1/04*      (2006.01)
    *H01R 24/68*      (2011.01)

(56) References Cited

U.S. PATENT DOCUMENTS

| | | |
|---|---|---|
| 5,187,744 A | 2/1993 | Richter |
| D343,107 S | 1/1994 | Fulton |
| 5,305,381 A | 4/1994 | Wang et al. |
| 5,587,645 A | 12/1996 | Sciammarella et al. |
| 5,648,712 A | 7/1997 | Hahn |
| 5,679,017 A | 10/1997 | Smith |
| 5,762,512 A | 6/1998 | Trant et al. |
| 5,903,645 A | 5/1999 | Tsay |
| 6,029,215 A | 2/2000 | Watts, Jr. et al. |
| 6,091,611 A | 7/2000 | Lanni |
| 6,341,218 B1 | 1/2002 | Poplawsky et al. |
| 6,510,067 B1 | 1/2003 | Toebes |
| 6,518,724 B2 | 2/2003 | Janik |
| 6,831,848 B2 | 12/2004 | Lanni |
| 6,848,802 B2 | 2/2005 | Chen |
| 6,861,822 B1 | 3/2005 | Wei |
| 6,938,867 B2 | 9/2005 | Dirks |
| 7,066,767 B2 | 6/2006 | Liao |
| 7,075,779 B2 | 7/2006 | Bothe et al. |
| 7,166,987 B2 | 1/2007 | Lee et al. |
| 7,254,424 B1 | 8/2007 | Reichert |
| D573,866 S | 7/2008 | Smith |
| 7,524,197 B2 | 4/2009 | Mills et al. |
| 7,528,323 B2 | 5/2009 | Wu et al. |
| 7,540,748 B2 | 6/2009 | Tracy et al. |
| 7,551,458 B2 | 6/2009 | Carnevali |
| 7,623,182 B2 | 11/2009 | Byrne et al. |
| 7,654,855 B2 | 2/2010 | Liao |
| 7,682,185 B2 | 3/2010 | Liao |
| 7,699,664 B2 | 4/2010 | Kim et al. |
| D617,863 S | 6/2010 | Moody et al. |
| 7,850,484 B2 | 12/2010 | Hayashi et al. |
| 7,857,659 B2 | 12/2010 | Wang et al. |
| 7,887,341 B2 | 2/2011 | Liao |
| 8,113,873 B1 | 2/2012 | Sarraf |
| 8,224,408 B2 | 7/2012 | Tomasini et al. |
| D676,380 S | 2/2013 | Sun |
| 8,367,235 B2 | 2/2013 | Huang |
| D680,941 S | 4/2013 | Deppen |
| 8,414,318 B1 | 4/2013 | Chen |
| 8,415,920 B2 | 4/2013 | Liao |
| D687,375 S | 8/2013 | Franco |
| 8,616,327 B1 | 12/2013 | Palacios |
| 8,686,683 B2 | 4/2014 | Caskey et al. |
| 8,712,482 B2 | 4/2014 | Sorias et al. |
| 8,794,997 B2 | 8/2014 | Tin |
| 8,805,640 B2 | 8/2014 | Nielsen et al. |
| 8,864,517 B2 | 10/2014 | Cohen |
| D719,008 S | 12/2014 | Han |
| D723,457 S | 3/2015 | Sorias |
| 9,027,486 B1 | 5/2015 | Berkovitz |
| 9,130,332 B2 | 9/2015 | Yosef |
| 9,161,464 B2 | 10/2015 | Liao |
| D745,628 S | 12/2015 | Barfoot et al. |
| 9,310,841 B2 | 4/2016 | Williams |
| 9,356,454 B2 | 5/2016 | Caren et al. |
| D760,647 S | 7/2016 | Chen |
| D762,169 S | 7/2016 | Lei |
| 9,429,994 B1 | 8/2016 | Vier |
| 9,473,607 B2 | 10/2016 | An |
| D774,377 S | 12/2016 | Hilliaho |
| D778,706 S | 2/2017 | Atkins |
| 9,568,148 B2 | 2/2017 | Carnevali |
| D783,526 S | 4/2017 | Warren |
| 9,620,911 B2 | 4/2017 | Warren |
| 9,627,802 B2 | 4/2017 | Warren |
| D791,070 S | 7/2017 | Son |
| D791,076 S | 7/2017 | Kim |
| D791,697 S | 7/2017 | Precheur |
| D792,752 S | 7/2017 | Chung et al. |
| D795,190 S | 8/2017 | Tzeng |
| 9,742,107 B2 | 8/2017 | Choi et al. |
| 9,812,811 B1 | 11/2017 | Gorin et al. |
| 9,904,327 B2 | 2/2018 | Whitt, III et al. |
| D813,339 S | 3/2018 | Maroney |
| D813,658 S | 3/2018 | Wright |
| D814,264 S | 4/2018 | Werdowatz |
| 9,997,882 B1 * | 6/2018 | Warren ............... H01R 31/065 |
| 2002/0149695 A1 | 10/2002 | Kayanuma |
| 2003/0218445 A1 | 11/2003 | Behar |
| 2004/0105024 A1 | 6/2004 | Takahashi |
| 2004/0251873 A1 | 12/2004 | Simoes et al. |
| 2005/0178633 A1 | 8/2005 | Liao |
| 2006/0105819 A1 | 5/2006 | Liao |
| 2006/0194467 A1 | 8/2006 | Beasley et al. |
| 2007/0034753 A1 | 2/2007 | Lee |
| 2007/0258204 A1 | 11/2007 | Chang et al. |
| 2008/0157715 A1 | 7/2008 | Rosenboom et al. |
| 2008/0227380 A1 | 9/2008 | Hsu et al. |
| 2009/0047827 A1 | 2/2009 | Liao |
| 2011/0031287 A1 | 2/2011 | Le Gette et al. |
| 2012/0049800 A1 | 3/2012 | Johnson et al. |
| 2012/0077361 A1 | 3/2012 | Youssefi-Shams et al. |
| 2012/0178506 A1 * | 7/2012 | Sorias ............... H02J 7/0042 |
| | | 455/573 |
| 2012/0214348 A1 | 8/2012 | Youssefi-Shams et al. |
| 2013/0057215 A1 | 3/2013 | Rajeswaran et al. |
| 2013/0093220 A1 | 4/2013 | Pajic |
| 2013/0150134 A1 | 6/2013 | Pliner et al. |
| 2013/0178252 A1 | 7/2013 | Sorias et al. |
| 2013/0242495 A1 | 9/2013 | Bathiche et al. |
| 2014/0030912 A1 | 1/2014 | Cohen |
| 2014/0085814 A1 | 3/2014 | Kielland |
| 2014/0139989 A1 | 5/2014 | Mori et al. |
| 2015/0011265 A1 * | 1/2015 | Walsh, Jr. ............ G06Q 20/381 |
| | | 455/569.1 |
| 2015/0015204 A1 | 1/2015 | Sorias et al. |
| 2015/0207286 A1 | 7/2015 | Chen et al. |
| 2015/0207350 A1 | 7/2015 | Chen et al. |
| 2015/0234108 A1 | 8/2015 | Harley, Jr. |
| 2015/0234478 A1 | 8/2015 | Belesiu et al. |
| 2015/0263447 A1 | 9/2015 | Liao |
| 2015/0268699 A1 | 9/2015 | Bathiche et al. |
| 2015/0380872 A1 * | 12/2015 | Warren ............. H01R 13/6675 |
| | | 439/529 |
| 2016/0087381 A1 | 3/2016 | Wong et al. |
| 2016/0090767 A1 | 3/2016 | Park et al. |
| 2016/0118758 A1 | 4/2016 | Cymerman |
| 2016/0141815 A1 * | 5/2016 | Warren .................. H01R 13/60 |
| | | 439/529 |
| 2016/0204816 A1 | 7/2016 | Abramovich |
| 2016/0209885 A1 | 7/2016 | Ellis |
| 2016/0218536 A1 | 7/2016 | Caren et al. |
| 2016/0261129 A1 * | 9/2016 | Warren ............... H01R 31/065 |
| 2016/0380457 A1 | 12/2016 | Criss |
| 2017/0005496 A1 * | 1/2017 | Warren ................ G06F 1/1626 |
| 2017/0012450 A1 * | 1/2017 | Warren ................ H02J 7/0042 |
| 2017/0101256 A1 | 4/2017 | Zeitlin |

(56) References Cited

U.S. PATENT DOCUMENTS

2017/0163080 A1\* 6/2017 Warren .................... H02J 7/025
2018/0248321 A1\* 8/2018 Warren .............. H01R 13/6675
2018/0248391 A1\* 8/2018 Warren ................. H02J 7/0044
2018/0248392 A1\* 8/2018 Warren .................. H01R 13/44

\* cited by examiner

ELECTRICAL CHARGING DEVICES WITH TRANSLATING STABILIZERS

CROSS-REFERENCE TO RELATED APPLICATIONS

The present application is a Continuation-in-Part Application of U.S. patent application Ser. No. 15/788,708, filed on Oct. 19, 2017, which is a Continuation-in-Part Application of U.S. patent application Ser. No. 15/697,307, filed on Sep. 6, 2017, which claims the benefit of U.S. Provisional Application No. 62/464,077, filed on Feb. 27, 2017, of U.S. Provisional Application No. 62/464,517, filed on Feb. 28, 2017, of U.S. Provisional Application No. 62/465,705, filed on Mar. 1, 2017, of U.S. Provisional Application No. 62/465,871, filed on Mar. 2, 2017, of U.S. Provisional Application No. 62/466,576, filed on Mar. 3, 2017, and of U.S. Provisional Application No. 62/473,225, filed on Mar. 17, 2017; U.S. patent application Ser. No. 15/788,708 also claims the benefit of U.S. Provisional Application No. 62/467,230, filed on Mar. 5, 2017; this application also claims the benefit of U.S. Provisional Application No. 62/532,060, filed on Jul. 13, 2017, and of U.S. Provisional Application No. 62/532,843, filed on Jul. 14, 2017. All of these applications are hereby incorporated by reference herein in their entireties, including all references cited therein.

FIELD

The present technology pertains to devices for electronic charging, and more specifically, but not by way of limitation, to electronic charging devices that couple with a wall outlet, as well as receive and retain an electronic device such as a Smartphone, tablet, laptop, and so forth, during charging. In some embodiments, the devices include stabilizers that are partially stored within tubular guides. These stabilizers can be deployed from within the tubular guides as desired to support the device when plugged into a power source.

SUMMARY

Various embodiments of the present disclosure are directed to an apparatus, including: (a) a cradle configured to receive and retain an electronic device; (b) an electronics sub-assembly comprising: (i) a housing, wherein the housing comprises laterally positioned tubular guides; (ii) an electrical conductor that protrudes forwardly from the housing; and (iii) a circuit within the housing that processes an electrical charge received through the electrical conductor; (c) means for electrically coupling the electronics sub-assembly with the electronic device; and (d) a stabilizer comprising armatures, the armatures being slidingly received within the tubular guides of the housing for storage, further wherein the armatures extend from the tubular guides and pivot downwardly.

Various embodiments of the present disclosure are directed to an apparatus, including: (a) an electronics sub-assembly comprising: (i) a housing, wherein the housing comprises laterally positioned tubular guides positioned inside of a sidewall that forms four sides of the housing; (ii) an electrical conductor; and (iii) a circuit within the housing that processes an electrical charge received through the electrical conductor; (b) means for electrically coupling the electronics sub-assembly with the electronic device; and (c) a stabilizer comprising armatures linked by a cross member, wherein the armatures are slidingly received within the tubular guides of the housing for storage, further wherein the armatures extend from the tubular guides to allow the cross member to contact a supporting surface when the electrical conductor is engaged with a power source providing the electrical charge.

Various embodiments of the present disclosure are directed to an apparatus, including: (a) an electronics sub-assembly comprising: (i) a housing, wherein the housing comprises laterally positioned tubular guides positioned inside of a sidewall that forms four sides of the housing; (ii) an electrical conductor; and (iii) a circuit within the housing that processes an electrical charge received through the electrical conductor to allow for charging any of an electronic device and an electrical energy storage unit, the electrical energy storage unit disposed within the housing; (b) means for electrically coupling the electronics sub-assembly with the electronic device; and (c) a stabilizer comprising armatures linked by a cross member, wherein the armatures are slidingly received within the tubular guides of the housing for storage, further wherein the armatures extend from the tubular guides to allow the cross member to contact a supporting surface when the electrical conductor is engaged with the power source providing the electrical charge. In some embodiments, the electrical energy storage unit is charged when the apparatus is coupled with a power source. In other embodiments, the electrical energy storage unit discharges electricity to the electronic device when the apparatus is disconnected from the power source;

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

The present disclosure is now described more fully with reference to the accompanying drawings, in which example embodiments of the present disclosure are shown. The present disclosure may, however, be embodied in many different forms and should not be construed as necessarily being limited to the example embodiments set forth herein. Rather, these example embodiments are provided so that the disclosure is thorough and complete, and fully conveys the concepts of the present disclosure to those skilled in the art. Also, features described with respect to certain example embodiments may be combined in and/or with various other example embodiments. Different aspects and/or elements of example embodiments, as disclosed herein, may be combined in a similar manner. Further, at least some example embodiments may individually and/or collectively be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity, at least as described herein, in any manner, irrespective of the at least one entity have any relationship to the subject matter of the present disclosure.

Generally described, the present disclosure is directed to devices and apparatuses that charge electronic device, such as cell phones, laptops, Smartphones, and other similar devices. In general, the devices disclosed herein can be plugged into a power source, such as a wall outlet using an integrated electrical conductor. The devices provide a surface or cradle that holds an attached electronic device. In some embodiments, the electronic device is coupled to a circuit in an example device through a cable or inductive charger interface. The circuit processes the electrical charge received from the power source to convert the same into an electrical charge that can be used to charge/power the electronic device. In some embodiments, an example device can integrate a battery or other power storage that is charged when the device is plugged into the power source. This power storage can operate as a secondary or backup battery for the electronic device if necessary.

These and other advantages of the present disclosure are provided in greater detail herein with reference to the collective drawings.

Figure 1:
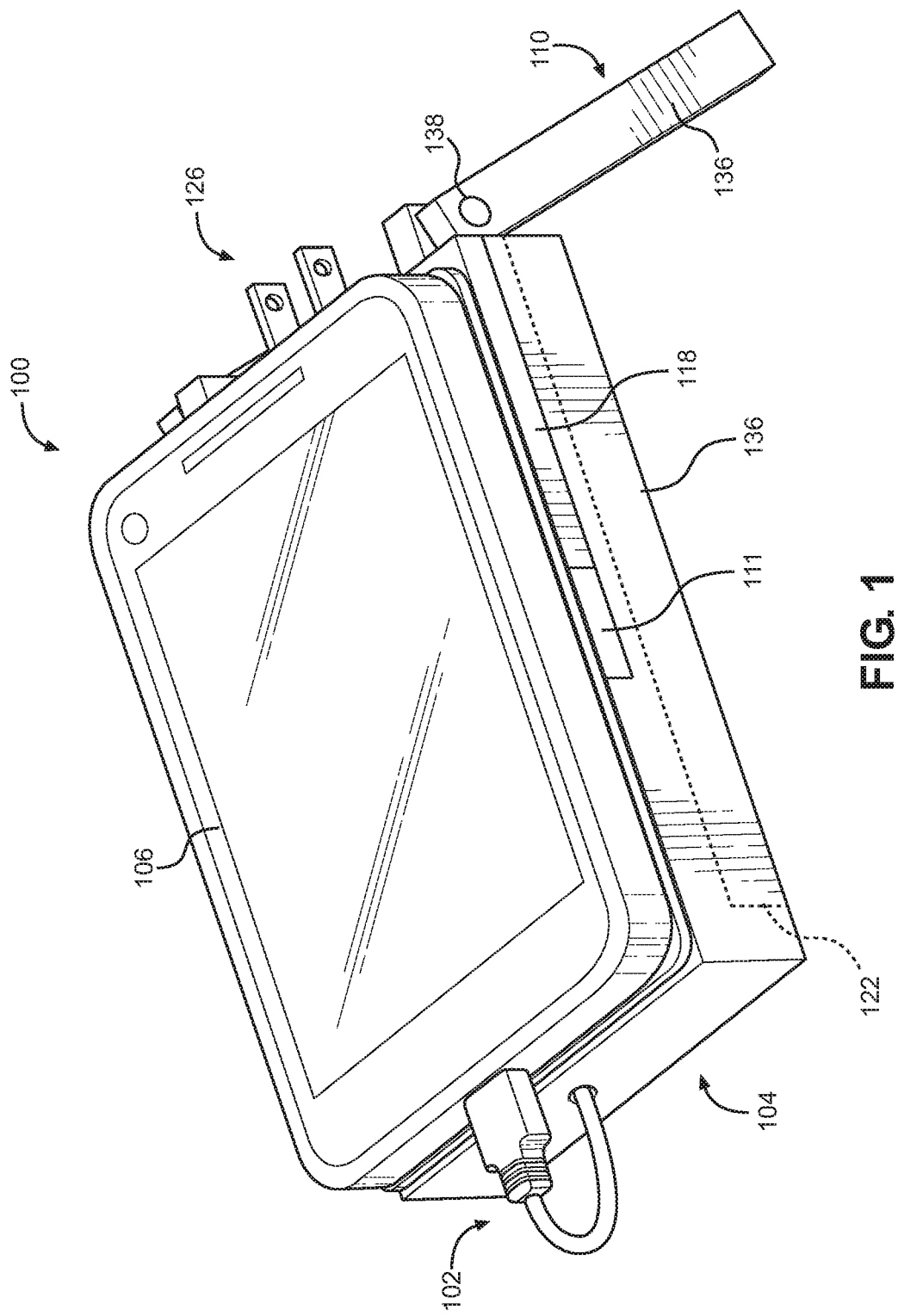
FIG. 1 is a perspective view of an example device constructed in accordance with the present disclosure.

FIG. 1 is an example apparatus 100 of the present disclosure, comprising generally a cradle 102 and an electronics sub-assembly 104 that supports an electronic device 106. The apparatus 100 can be coupled to a power source, such as a wall outlet. In some embodiments, the apparatus 100 can be supported through use of a stabilizer 110 when the apparatus 100 is coupled with the power source.

Figure 2:
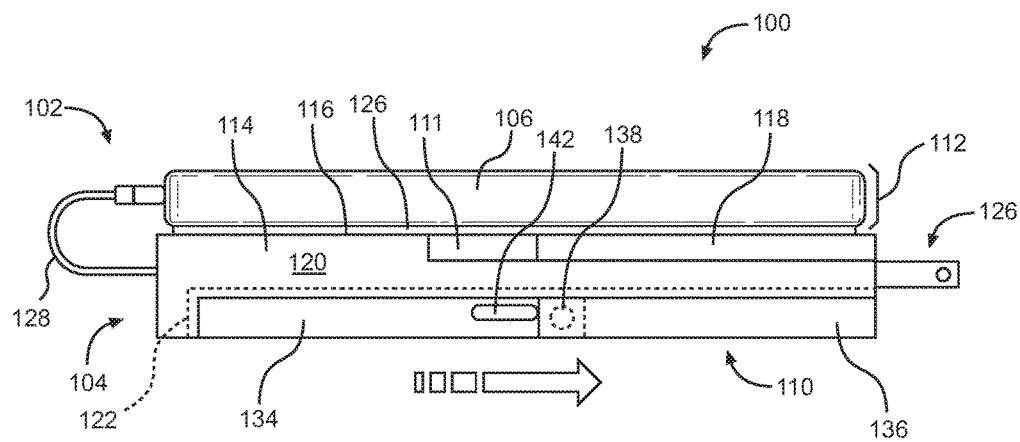
FIG. 2 is a side view of the example device of FIG. 1 having a stabilizer in a stored configuration.
Figure 3:
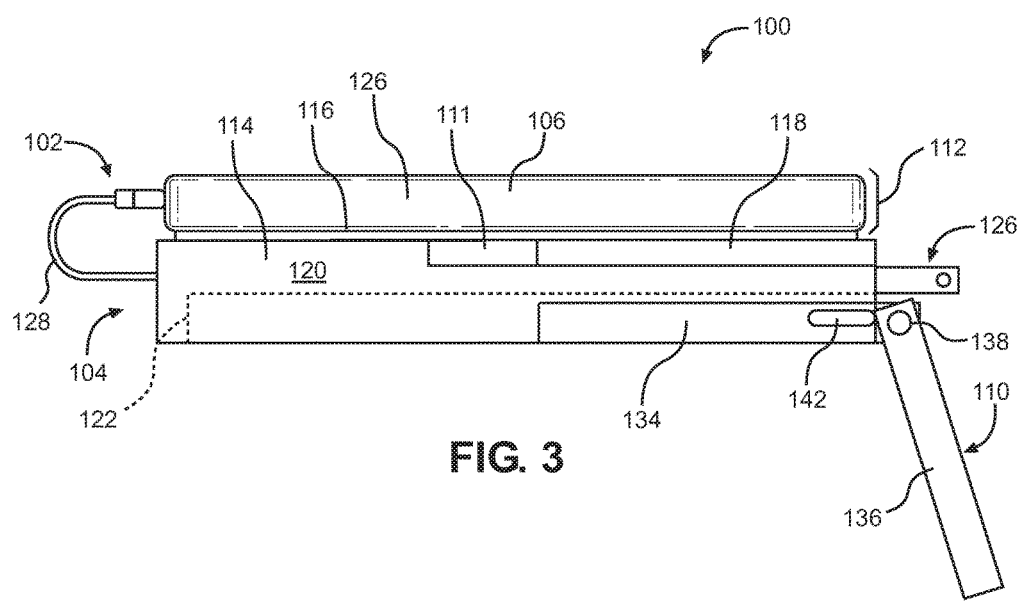
FIG. 3 is a side view of the example device of FIG. 1 having a stabilizer in a deployed configuration.

Turning to FIGS. 2 and 3, in more detail, the cradle 102 can comprise any suitable means for releaseably retaining the electronic device 106. In this embodiment, the cradle 102 comprises a set of corner tabs, such as tab 112. These tabs can be mounted to an upper surface of a housing of the electronics sub-assembly 104, as will be discussed in greater detail below. These tabs are resilient and allow for the electronic device 106 to be held securely when placed in the cradle 102, but the tabs flex to allow for the electronic device 106 to be removed as desired.

According to some embodiments, the electronics sub-assembly comprises a housing 114. The housing 114 provides an enclosure for a circuit that is used to process or otherwise condition an electrical charge received from a power source. In some embodiments, the housing 114 comprises an upper surface 116 from which the tabs, such as tab 112 extend. The upper surface 116 of the housing can comprise a gripping layer or coating that helps secure the electronic device 106 in place in embodiments where a cradle and/or tabs are not desired.

In various embodiments, the electronics sub-assembly 104 can comprise a circuit 118 in the form of a printed circuit board with various permutations of electrical components. In general, the electronics sub-assembly 104 is configured to transform the AC power waveform received from an outlet into DC power that is appropriate for charging the electronic device 106.

In some embodiments, the electronics sub-assembly 104 can include combinations of electrolytic capacitors, MOSFET switching transistors, flyback transformers, a controller integrated circuit, capacitors, diodes, R-C snubber circuits, EMI (electromagnetic interference) circuits, inductors, control chips, Schottky diodes, Tantalum filter capacitors, as well as any combinations thereof, in order to provide the desired transformation of AC to DC functions.

In various embodiments, the electronics sub-assembly 104 is an advanced flyback switching power supply that receives the AC voltage in ranges of 100 to 240 volts, and produces approximately five watts of smooth voltage power. AC line power is converted to high voltage DC current using a diode bridge. The DC power is switched off and on by a transistor controlled by a power supply controller IC.

In some embodiments, the chopped DC power supply is fed back into a flyback transformer, which converts the DC power to a low voltage AC waveform. The AC waveform is then converted into DC, which is filtered with a filter to obtain smooth power that is substantially free of interference. The electronics assembly 106 can comprise a feedback circuit that measures the voltage output to the electrical connector (e.g., prongs or USB, for example) and sends a signal to the controller IC, which adjusts the switching frequency to obtain a desired voltage.

In various embodiments, the electronics sub-assembly 104 can comprise a circuit that is configured to convert AC to DC power. In another, the circuit is configured to transform or step down a DC input at a first power level to a second power level that is usable for the electronic device 106.

Also, the housing 114 comprises a rechargeable battery 111 or other power storage means that receives and stores power when the apparatus 100 is coupled to the power source. The rechargeable battery 111 discharges electricity to the electronic device 106 when the apparatus 100 is disconnected from the power source. In this way, the rechargeable battery 111 functions as a backup or secondary battery that can be used to extend the battery capacity of the electronic device 106.

In some embodiments, the housing 114 comprises an outer peripheral sidewall 120 that forms four sides of the housing 114. The housing 114 also comprises two laterally positioned tubular guides 122 and 124. These laterally positioned tubular guides 122 and 124 receive armatures of the stabilizer 110, as will be discussed in greater detail infra. In other embodiments, the tubular guides 122 and 124 are located internally to the outer peripheral sidewall 120 of the housing 114.

The housing 114 comprises an electrical conductor 126 that protrudes forwardly from the housing 114. In some embodiments, the housing 114 can have an opening underneath allowing for a finger to forwardly push the electrical conductor 126 to protrude from the housing 114. In other embodiments, to prevent the electrical conductor 126 from protruding from the housing 114 unintentionally or inadvertently, the housing 114 can have any of springs, magnets, protrusions with associated depressions, or raised edges with associated depressions. The electrical conductor 126 is electrically coupled to the circuit 118. According to some embodiments, the electrical conductor 126 comprises any of prongs, USB interfaces, micro SD interfaces, lightning interfaces, and combinations thereof.

In various embodiments, the apparatus 100 comprises a means for electrically coupling the electronics sub-assembly 104 with the electronic device 106, such as a cable 128. In another embodiment, the means for electrically coupling the electronics sub-assembly 104 with the electronic device 106 could include an inductive charging interface that is positioned on the upper surface 116 of the housing 114. Assuming the electronic device 106 is capable of inductive charging, when the electronic device 106 is positioned in the cradle 102, the inductive charging interface of the apparatus 100 mates with inductive charging interface of the electronic device 106, allowing for inductive charging therebetween.

In some embodiments, the stabilizer 110 comprises armatures 130 and 132. These armatures 130 and 132 are slidingly received within the tubular guides 122 and 124 of the housing 114 for storage. The armatures 130 and 132 each extend from the tubular guides 122 and 124, respectively. In some embodiments, the armatures 130 and 132 are each configured with pivoting linkages that allow for a portion of the stabilizer 110 to pivot.

Figure 5:
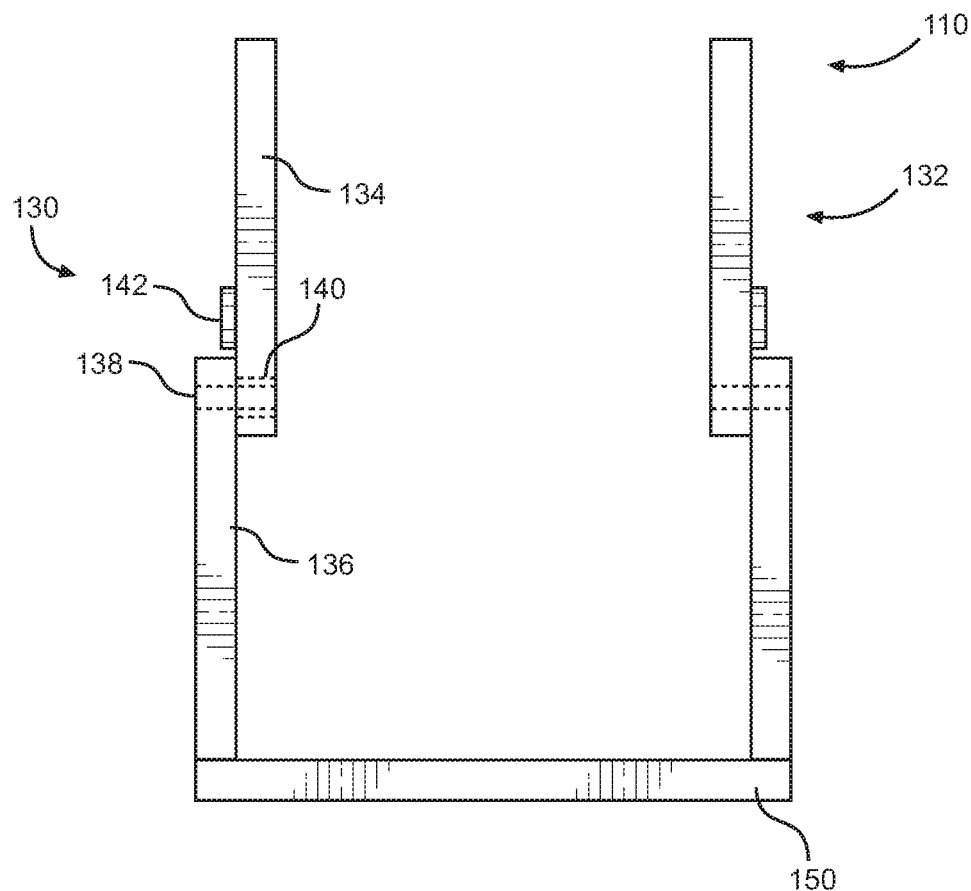
FIG. 5 is a top plan view of an example stabilizer constructed in accordance with the present disclosure.

For example, in FIG. 5, the stabilizer 110 is illustrated in detail. Each of the armatures 130 and 132 comprise a pair of linkages. For example, armature 130 comprises a first linkage 134 and a second linkage 136. The second linkage 136 pivots relative to the first linkage 134. In some embodiments, each of the terminal ends of the armatures 130 and 132 contacts a supporting surface when the stabilizer 110 is in a deployed configuration.

According to some embodiments, second linkage 136 comprises a pin 138 that fits within an aperture 140 of the first linkage 134. In some embodiments, the first linkage 134 comprises a stop 142 that limits the pivoting movement of the second linkage 136 relative to the first linkage 134. In further embodiments, in lieu of stop 142, there can be a stop bar. The stop bar can connect armatures 130 and 132 (shown in FIGS. 4 and 5). The stop bar can limit the pivoting movement of the linkages, similar to how stop 142 functions.

The sliding and pivoting movement of armature 130 is illustrated in FIGS. 2 and 3. FIG. 2 illustrates the stabilizer 110 in a stored configuration. When stored, the first linkage 134 and second linkage 136 are located within tubular guide 122. The same positioning of armature 132 exists, although it is not illustrated in these views.

Figure 4:
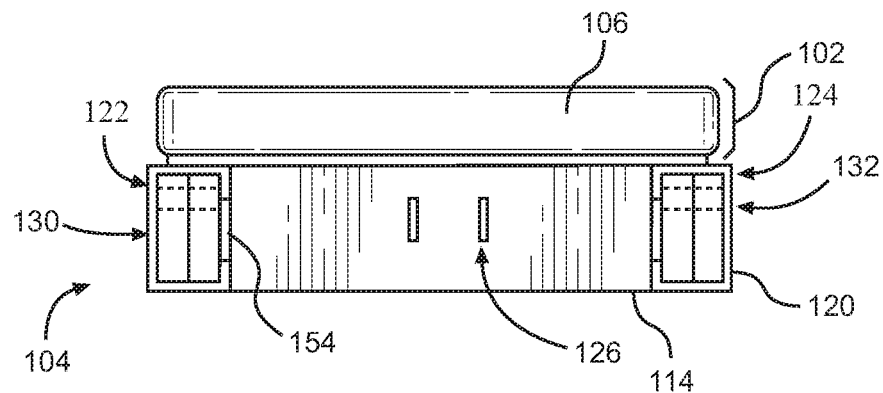
FIG. 4 is a front elevation view of the example device of FIG. 1.

Referring briefly to FIGS. 2-4, when the stabilizer 110 is translated from the stored to the deployed configuration, the first linkage 134 slides along a surface 152 (see FIG. 4) of the tubular guide 122. This sliding engagement can be facilitated by the sizing of the first linkage 134 relative to the tubular guide 122 or through a sliding interface between the surface 152 and the first linkage 134 such as a track 154 or other means.

FIG. 3 illustrates the stabilizer 110 in a deployed configuration. In this configuration the armature 130 is slid forward by an end user. The first linkage 134 slightly protrudes from the tubular guide 122 and the second linkage 136 pivots downwardly until engaging with the stop 142 of the first linkage 134.

After use, the end user can slide the armatures back into their respective tubular guide to place the stabilizer back in the stored position.

In other embodiments as in FIG. 5, the armatures 130 and 132 can be coupled using a cross member 150. The cross member 150 contacts a supporting surface when the stabilizer 110 is in a deployed configuration. In these embodiments, the cross member 150 is positioned outside the housing 114 directly below the electrical conductor 126 when the stabilizer 110 is in the stored configuration. The cross member 150 provides the end user with a place to grip the stabilizer 110 in order to translate the stabilizer 110 from the stored to deployed configuration.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its nonitalicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing and/or other any other types of manufacturing. For example, some manufacturing processes include three dimensional (3D) printing, laser cutting, computer numerical control (CNC) routing, milling, pressing, stamping, vacuum forming, hydroforming, injection molding, lithography and/or others.

Any and/or all elements, as disclosed herein, can include, whether partially and/ or fully, a solid, including a metal, a mineral, a ceramic, an amorphous solid, such as glass, a glass ceramic, an organic solid, such as wood and/or a polymer, such as rubber, a composite material, a semiconductor, a nano-material, a biomaterial and/or any combinations thereof. Any and/or all elements, as disclosed herein, can include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, non-transparency, luminescence, anti-reflection and/or holographic, a photo-sensitive coating, an electronic and/or thermal property coating, such as for passivity, insulation, resistance or conduction, a magnetic coating, a water-resistant and/or waterproof coating, a scent coating and/or any combinations thereof.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings is turned over, then the elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. An apparatus, comprising:
   a cradle configured to receive and retain an electronic device;
   an electronics sub-assembly comprising:
      a housing, wherein the housing comprises laterally positioned tubular guides;
      an electrical conductor that protrudes forwardly from the housing; and
      a circuit within the housing that processes an electrical charge received through the electrical conductor;
   means for electrically coupling the electronics sub-assembly with the electronic device; and
   a stabilizer comprising armatures, the armatures being slidingly received within the tubular guides of the housing for storage, further wherein the armatures extend from the tubular guides and pivot downwardly.

2. The apparatus according to claim 1, wherein the cradle comprises tabs for releaseably retaining the electronic device.

3. The apparatus according to claim 1, wherein the armatures each comprising a first linkage and a second linkage.

4. The apparatus according to claim 3, wherein the second linkage is pivotally coupled to the first linkage.

5. The apparatus according to claim 4, wherein the first linkage comprises a stop, wherein pivoting movement of the second linkage is limited by the stop.

6. The apparatus according to claim 4, wherein the second linkage comprises a pin that engages with an aperture in the first linkage, the first linkage being positioned forwardly of the aperture.

7. The apparatus according to claim 1, wherein the electrical conductor comprises any of prongs, USB interfaces, micro SD interfaces, lightning interfaces, and combinations thereof.

8. The apparatus according to claim 1, wherein the tubular guides are located internally to an outer peripheral sidewall of the housing.

9. An apparatus, comprising:
   an electronics sub-assembly comprising:
      a housing, wherein the housing comprises laterally positioned tubular guides positioned inside of a sidewall that forms four sides of the housing;
      an electrical conductor; and
      a circuit within the housing that processes an electrical charge received through the electrical conductor;
   means for electrically coupling the electronics sub-assembly with the electronic device; and
   a stabilizer comprising armatures linked by a cross member, wherein the armatures are slidingly received within the tubular guides of the housing for storage, further wherein the armatures extend from the tubular guides to allow the cross member to contact a supporting surface when the electrical conductor is engaged with a power source providing the electrical charge.

10. The apparatus according to claim 9, further comprising a cradle that comprises tabs for releaseably retaining the electronic device.

11. The apparatus according to claim 9, wherein the armatures each comprising a first linkage and a second linkage.

12. The apparatus according to claim 11, wherein the second linkage is pivotally coupled to the first linkage.

13. The apparatus according to claim 12, wherein the first linkage comprises a stop, wherein pivoting movement of the second linkage is limited by the stop.

14. The apparatus according to claim 12, wherein the second linkage comprises a pin that engages with an aperture in the first linkage, the first linkage being positioned forwardly of the aperture.

15. The apparatus according to claim 9, wherein the electrical conductor comprises any of prongs, USB interfaces, micro SD interfaces, lightning interfaces, and combinations thereof.

16. The apparatus according to claim 9, wherein the tubular guides are located internally to an outer peripheral sidewall of the housing.

17. The apparatus according to claim 9, wherein the electrical conductor comprises an inductive charging interface disposed on an upper surface of the housing.

18. An apparatus, comprising:
   an electronics sub-assembly comprising:
      a housing, wherein the housing comprises laterally positioned tubular guides positioned inside of a sidewall that forms four sides of the housing;
      an electrical conductor; and
      a circuit within the housing that processes an electrical charge received through the electrical conductor to allow for charging any of an electronic device and an electrical energy storage unit, the electrical energy storage unit disposed within the housing;
   means for electrically coupling the electronics sub-assembly with the electronic device; and
   a stabilizer comprising armatures linked by a cross member, wherein the armatures are slidingly received within the tubular guides of the housing for storage, further wherein the armatures extend from the tubular guides to allow the cross member to contact a supporting surface when the electrical conductor is engaged with the power source providing the electrical charge.

19. The apparatus according to claim 18, wherein the electrical energy storage unit is charged when the apparatus is coupled with a power source.

20. The apparatus according to claim 18, wherein the electrical energy storage unit discharges electricity to the electronic device when the apparatus is disconnected from the power source.

* * * * *